(12) United States Patent
Rink et al.

(10) Patent No.: US 9,283,929 B2
(45) Date of Patent: Mar. 15, 2016

(54) BELT RETRACTOR WITH CONTROL TOOTHING

(75) Inventors: Jurgen Rink, Waldstetten (DE); Boris Siebeck, Schwabisch Gmund (DE); Demal Sehic, Schwabisch Gmund (DE); Thomas Kielwein, Eschach (DE); Markus Dauber, Bartenbach (DE); Christian Mucke, Mogglingen (DE); Julius Adomeit, Berlin (DE)

(73) Assignee: TRW Automotive GmbH (DE)

( * ) Notice: Subject to any disclaimer, the term of this patent is extended or adjusted under 35 U.S.C. 154(b) by 180 days.

(21) Appl. No.: 14/117,896

(22) PCT Filed: May 15, 2012

(86) PCT No.: PCT/EP2012/002073
§ 371 (c)(1),
(2), (4) Date: Dec. 17, 2013

(87) PCT Pub. No.: WO2012/156074
PCT Pub. Date: Nov. 22, 2012

(65) Prior Publication Data
US 2014/0091167 A1    Apr. 3, 2014

(30) Foreign Application Priority Data
May 18, 2011    (DE) .......................... 10 2011 101 965

(51) Int. Cl.
*B60R 22/40* (2006.01)
*B60R 22/405* (2006.01)

(52) U.S. Cl.
CPC ............... *B60R 22/40* (2013.01); *B60R 22/405* (2013.01)

(58) Field of Classification Search
CPC ............................. B60R 22/40; B60R 22/405
USPC .................................... 242/384, 384.1–384.6
See application file for complete search history.

(56) References Cited

U.S. PATENT DOCUMENTS

| 4,186,895 A | 2/1980 | Burghardt et al. |
| 4,307,852 A * | 12/1981 | Seifert et al. ............... 242/376.1 |
| 4,366,934 A * | 1/1983 | Seifert et al. ............... 242/376.1 |
| 4,422,594 A * | 12/1983 | Honl .......................... 242/383.4 |
| 5,333,906 A | 8/1994 | Fujimura et al. |
| 7,537,179 B2 * | 5/2009 | Schmidt et al. ............... 242/384 |

FOREIGN PATENT DOCUMENTS

GB    2 247 154    2/1992

* cited by examiner

*Primary Examiner* — Sang Kim
(74) *Attorney, Agent, or Firm* — Tarolli, Sundheim, Covell & Tummino LLP

(57) ABSTRACT

A belt retractor (10) for a vehicle seat belt, includes a frame (12) provided with a plurality of blocking teeth (22), a belt reel (14) being rotatably supported in the frame (12) and a blocking tooth system (24) adapted to be engaged with the blocking teeth (22). A control lever (28) pivoted on the frame (12) and accommodates the belt reel (14). A sensor (34) actuates when a predetermined vehicle deceleration is exceeded. A control tooth system (26) with which the sensor (34) is adapted to interact is provided at the belt reel (14).

20 Claims, 4 Drawing Sheets

BELT RETRACTOR WITH CONTROL TOOTHING

RELATED APPLICATIONS

This application corresponds to PCT/EP2012/002073, filed May 15, 2012, which claims the benefit of German Application No. 10 2011 101 965.4, filed May 18, 2011, the subject matter, of which are incorporated herein by reference in their entirety.

BACKGROUND OF THE INVENTION

The invention relates to a belt retractor for a vehicle seat belt, comprising a frame provided with a plurality of blocking teeth, a belt reel rotatably supported in the frame and a blocking tooth system adapted to be engaged with the blocking teeth, a control lever being pivoted on the frame and accommodating the belt reel and a sensor that actuates when a predetermined vehicle deceleration is exceeded.

In this type of belt retractor the belt reel is displaced, when it is to be blocked, relative to the frame so that the tooth system attached thereto engages with the blocking teeth provided on the frame. For this purpose, a control mechanism is provided to ensure that the tooth system of the belt reel is controlled to engage at the correct position in the blocking teeth so that an engagement of the tooth system in the blocking teeth is produced before high loads are acting on the belt reel.

For the webbing-sensitive blocking the control mechanism includes a control lever usually provided with an internal tooth system in which a control pawl arranged at an end face of the belt reel can engage. In the case of webbing-sensitive release the control pawl is pivoted outwardly from a home position by exploiting mass inertia forces such that it engages in the internal tooth system. Thus the belt reel is no longer freely rotatable but is coupled to the control lever.

For vehicle-sensitive blocking the control mechanism includes a coupling disk connected to the belt reel in a rotationally fixed manner. A sensor lever engages in the coupling disk when the sensor actuates upon a predetermined vehicle deceleration being exceeded. Thus the belt reel cannot freely rotate any longer.

When in such case, i.e. when the belt reel is no longer freely rotatable, tensile force is exerted on the webbing, this results in the control lever pivoting together with the belt reel about the pivot point at which the control lever is arranged on the frame and the belt reel is controlled to engage in the blocking teeth on the frame. The arrangement of the teeth of the internal tooth system at the control lever and the teeth of the coupling disk relative to the blocking teeth ensures that the belt reel is basically guided with its tooth system at the correct position into the blocking teeth so that the tooth crests of the tooth system of the belt reel are prevented from impacting on the tooth crests of the blocking teeth.

It is a drawback of the described lock mechanism that in a dynamic vehicle-sensitive activation of the blocking mechanism the coupling disk can twist or deform relative to the tooth system of the belt reel which results in the fact that the association of the blocking teeth with the tooth system of the belt reel cannot be precisely maintained any more. This may result in the fact that the tooth system of the belt reel is not controlled to engage at the correct position in the blocking teeth and the final engagement is brought about already under load.

SUMMARY OF THE INVENTION

It is the object of the invention to further develop a belt retractor of the type described in the beginning so that even in dynamic blocking operations the association of the tooth system of the belt reel with the blocking teeth on the frame is reliably maintained.

For achieving this object, according to the invention it is provided in a belt retractor of the type as described in the beginning that at the belt reel a control tooth system is provided with which the sensor can interact. The invention is based on the principal idea of not making the "detour" via the coupling disk in the vehicle-sensitive blocking but of directly locking the belt reel. For this purpose, the control tooth system is provided at the belt reel, whereby the coupling disk can be dispensed with.

In accordance with a preferred embodiment of the invention, an intermediate lever adapted to be engaged in the control tooth system by the sensor is provided. The intermediate lever is preferably supported on the control lever. This enables the intermediate lever to be reliably held in engagement with the control tooth system of the belt reel even during pivoting of the belt reel and the control lever and to keep the belt reel rotationally fixed, as the intermediate lever is pivoted along with the control lever.

It is preferably provided that the blocking tooth system and the control tooth system are juxtaposed in the axial direction at a flange of the belt reel. This results in a compact design.

The control tooth system can be arranged on a disk which is held to be rotationally fixed to the flange. The disk can be separately fabricated, which offers the advantage that the control tooth system can be fabricated with substantially higher accuracy. Especially the teeth of the control tooth system can be manufactured to be approximately free of radius. In this way the intermediate lever can engage by far more exactly in the control tooth system, thereby the responsive behavior of the belt reel blocking being adapted to be improved. Since the control tooth system is separately fabricated, which renders the shape of the belt reel less complex, the manufacture of the belt reel is simpler and thus less expensive. Due to the simpler structure the belt reel is also less susceptible to damage during transport or manufacture.

In order to connect the disk in a rotationally fixed manner to the flange, preferably lands projecting in the axial direction which engage between the teeth of the blocking tooth system in the axial direction are provided on the disk. The control tooth system can be arranged on the lands so that the blocking tooth system and the control tooth system are adjacent to each other in the mounted state.

The disk and the belt reel are preferably connected in a force-fit and form-fit manner.

Preferably, the blocking tooth system and the control tooth system have the same pitch and the same orientation, with the teeth of the control tooth system having a more pointed or narrower design than the teeth of the blocking tooth system. In this way there is ample space available between the individual teeth of the control tooth system for controlling engagement of the intermediate lever without the risk of bouncing teeth being given.

At the belt reel a control pawl is preferably provided which can be controlled to engage in an internal tooth system provided at the control lever in a webbing-sensitive manner. In this way the webbing-sensitive blocking of the belt reel can be effectuated in the proven conventional fashion.

In accordance with an embodiment of the invention, the frame is provided with two side members each of which is provided with blocking teeth, and the belt reel is provided with a blocking tooth system at each of the two axial ends. This configuration permits the loads acting during blocking of the belt reel to be evenly discharged into the frame via the two blocking tooth systems at the axial ends of the belt reel.

BRIEF DESCRIPTION OF THE DRAWINGS

Hereinafter the invention shall be described by way of an embodiment represented in the enclosed drawings, in which.

DESCRIPTION OF THE EXEMPLARY EMBODIMENTS

Figure 1:
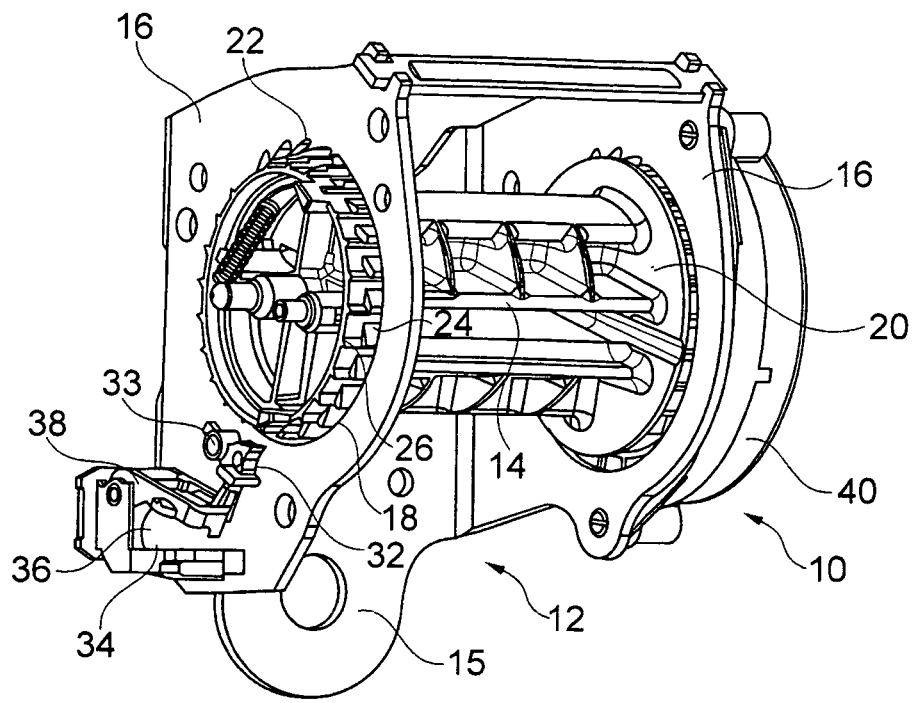
FIG. 1 shows in a schematic perspective view a belt retractor according to the invention in the initial condition.
Figure 2:
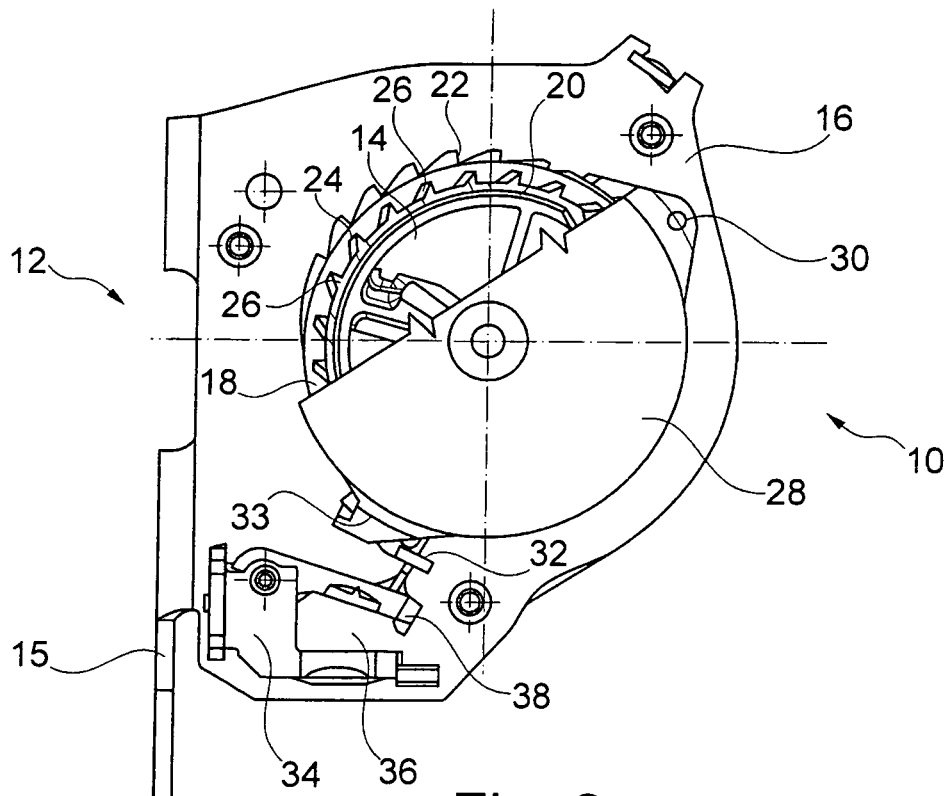
FIG. 2 shows the belt retractor of FIG. 1 in a schematic side view.

In FIGS. 1 and 2 a belt retractor 10 including a frame 12 and a belt reel 14 is illustrated. The frame 12 has a rear member 15 and two side members 16, each of the side members 16 being provided with an aperture 18 inside of which a flange 20 provided at each of the axial ends of the belt reel is accommodated. The edge of each aperture 18 is provided with plural blocking teeth 22 whose geometry and pitch is adjusted to a blocking tooth system 24 formed at each flange of the belt reel 14.

Figure 5:
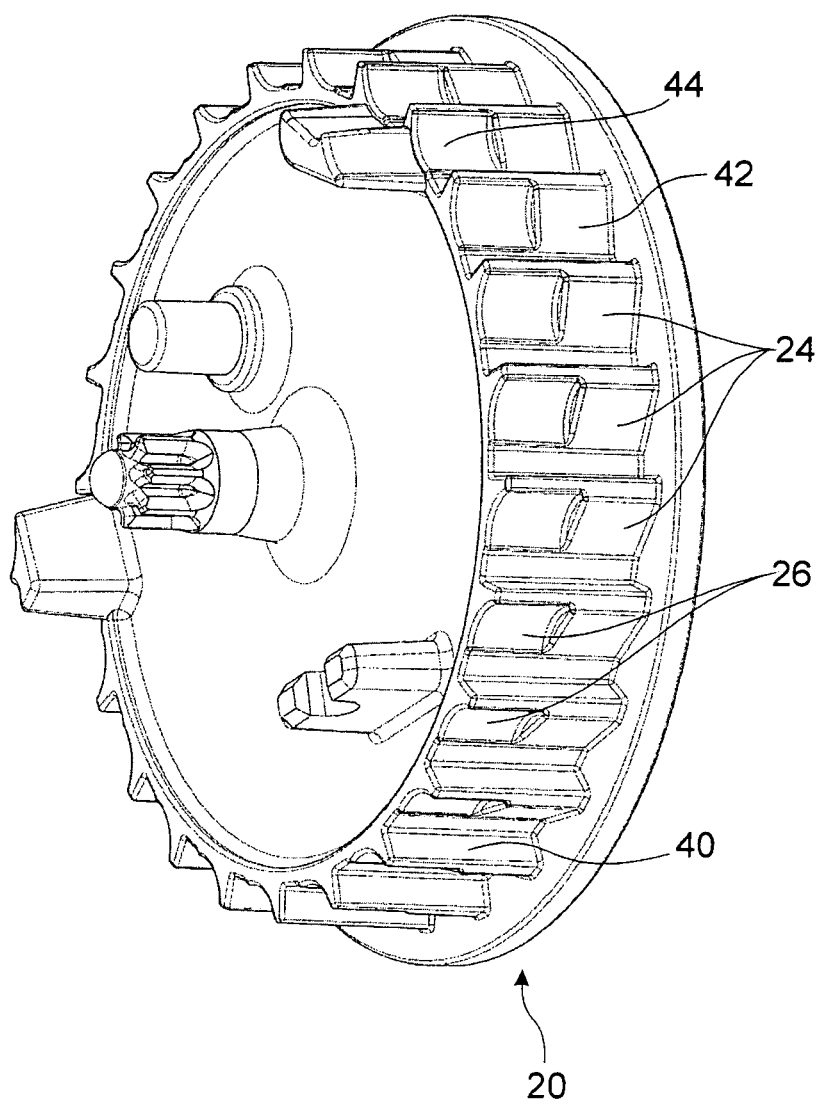
FIG. 5 shows the tooth system side of the belt reel.

At either of the two flanges 20 of the belt reel 14 a control tooth system 26 is formed, viewed in the axial direction, immediately adjacent to the blocking tooth system 24, the control tooth system being in conformity with the blocking tooth system 24 as regards its pitch and its arrangement viewed in the circumferential direction. The difference between the blocking tooth system 24 and the control tooth system 26 consists especially in the geometry of the tooth backs, as is evident from FIG. 5. The tooth radius of the locking tooth system and the blocking tooth system is identical. Equally identical is the shape of the tooth front 40, i.e. the load-bearing flank of the teeth. The tooth backs 42 of the blocking tooth system 24 have a substantially straight surface and the tooth thickness of the blocking tooth system is larger than that of the control tooth system. The tooth backs 44 of the control tooth system 26 have a concave shape so that in total the tooth thickness of the control tooth system is reduced vis-à-vis the blocking tooth system while the tooth distance is identical.

At either of the two side members 16 of the frame 12 of the belt retractor 10 there is arranged a control lever 28 surrounding the control tooth system 26 in a cap-like form and being mounted to be restrictedly pivoting with a pivot pin 30 at the corresponding side member 16 of the frame 12. On its inside the control lever 28 is provided with an internal tooth system provided for a webbing-sensitive blocking of the belt reel known per se. The internal tooth system and a control pawl arranged at the belt reel adapted to be engaged in the internal tooth system in a webbing-sensitive manner are not illustrated here.

For vehicle-sensitive locking an intermediate lever 32 is pivoted on the control lever 28 (cf, mount 33). The intermediate lever can be pivoted out of the initial position shown in FIGS. 1 and 2 in which it does not engage in the control tooth system 26 so that its tip engages in the control tooth system 26. For pivoting the intermediate lever 32 a sensor 34 is provided which is known as to its basic design and is responsive in a vehicle-sensitive manner. The sensor 34 is arranged such that a sensor lever 38 operable by a sensor ball 36 is adapted to control the intermediate lever 32 to engage out of the initial position in the control tooth system 26.

Figure 3:
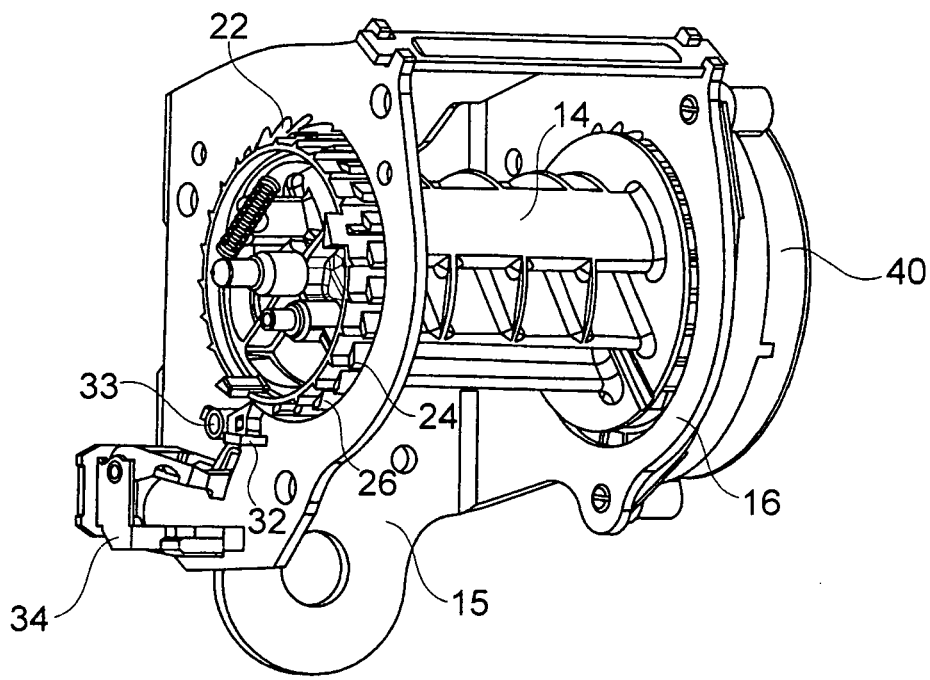
FIG. 3 shows the belt retractor including the belt reel blocked in a vehicle-sensitive manner in a view corresponding to that of FIG. 1.
Figure 4:
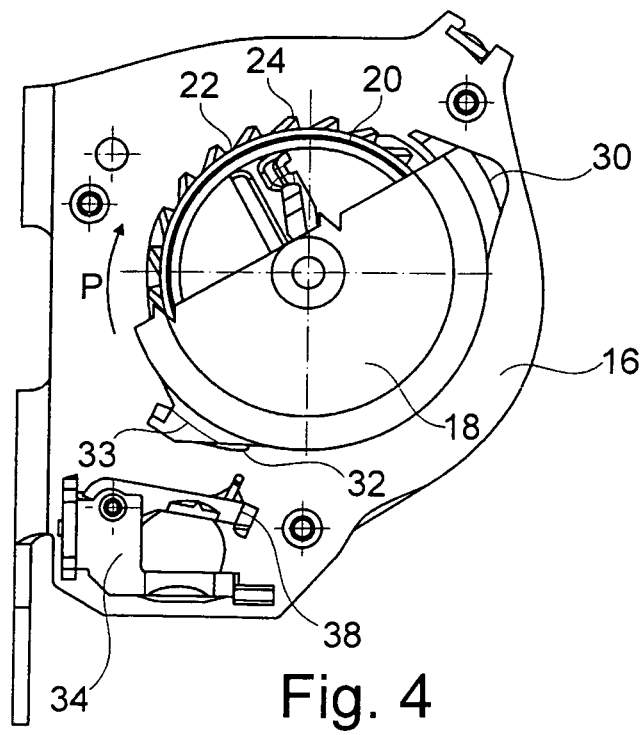
FIG. 4 shows the belt retractor of FIG. 3 in a view corresponding to that of FIG. 2.

As long as the intermediate lever 32 is provided in the position shown in FIGS. 1 and 2, the belt reel can rotate freely inside the apertures 18 of the side members 16 of the frame 12 (assuming that no webbing-sensitive blocking has been triggered). In this case the belt reel is guided by two housing shells a rear housing shell 40 of which is visible in FIG. 1. When the vehicle-sensitive sensor 34 actuates, the intermediate lever 32 is adjusted by the sensor lever 38 so that the tip of the intermediate lever 32 engages in the control tooth system 26 (cf. especially FIG. 3). When in this state tension is exerted on the webbing, the belt reel is rotated in the direction of arrow P of FIG. 4. Since the intermediate lever 32 directly bears on the control lever 28, the tension exerted on the webbing results in the fact that the belt reel 14 along with the control lever 28 is pivoted about the pivot pin 30 in the direction of arrow P (cf. also FIG. 4, clearly illustrating how the intermediate lever 32 engaging in the control tooth system 26 has been lifted off the sensor lever 38). Thus the blocking tooth system 24 engages in the blocking teeth 22 of the frame 12 so that the belt reel 14 is reliably blocked relative to the frame 12.

The arrangement of the intermediate lever 32 at the control lever 28 ensures that the teeth of the blocking tooth system 24 are controlled to engage at the correct position in the blocking teeth 22 on the frame 12. Due to the reduced tooth thickness of the control tooth system 26 the arc length available for engagement of the intermediate lever 32 is increased while the tooth pitch remains the same. Thus a more rapid and better engagement is obtained.

Figure 6:
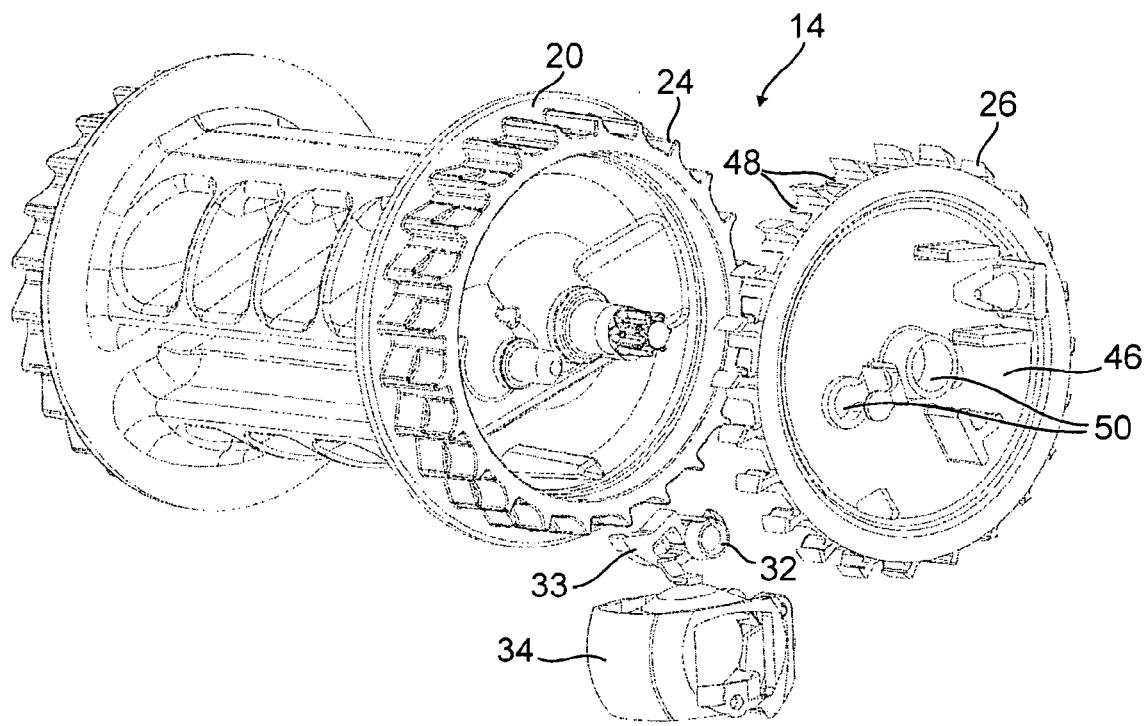
FIG. 6 shows a second embodiment of a belt reel for a belt retractor according to the invention.
Figure 7:
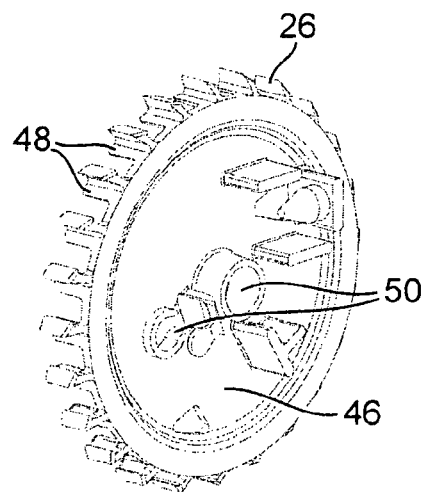
FIG. 7 shows a detailed view of the control tooth system of the belt reel of FIG. 6.

A second embodiment of the belt retractor 10 according to the invention is illustrated in FIGS. 6 and 7. The structure of this belt retractor 10 substantially corresponds to the belt retractor 10 illustrated in FIGS. 1 to 5. In contrast to the latter, the control tooth system 26 is arranged on a disk 46 which is connected to be rotationally fixed to the flange 20.

On the side facing the flange 20 the disk 46 includes plural lands 48 projecting in the axial direction. The teeth of the control tooth system 26 are arranged on the lands 48. Furthermore plural recesses 50 corresponding to projections of the flange 20, for example the bearing of the belt reel 14, are provided on the disk 46.

For assembling the control tooth system 26 and the disk 46, respectively, the disk 46 is attached to the flange 20 in the axial direction, wherein the recesses 50 are attached to corresponding projections of the flange 20 and the lands 48 engage between the teeth of the blocking tooth system 24. In the assembled condition the blocking tooth system 24 and the control tooth system 26 are thus directly adjacent to each other.

The arrangement of the control tooth system 26 on a separate disk 46 offers the advantage that the teeth of the control tooth system 26 can be separately fabricated, thereby higher accuracy being achieved. In particular, the teeth of the control tooth system can be fabricated approximately radius-free. Such higher accuracy in manufacturing the control tooth system 26 enables the intermediate lever 32 to be engaged in a substantially exacter manner and thus the blocking of the belt retractor 10 to be controlled in a substantially more accurate and less scattered manner.

The invention claimed is:

1. A belt retractor (10) for a vehicle seat belt, comprising a frame (12) provided with a plurality of blocking teeth (22), a belt reel (14) rotatably supported in the frame (12) and a blocking tooth system (24) adapted to be engaged with the blocking teeth (22), a control lever (28) being pivoted on the frame (12) and rotatably supporting the belt reel (14) and a sensor (34) which actuates when a predetermined vehicle deceleration is exceeded, wherein a control tooth system (26) with which the sensor (34) is adapted to interact to stop rotation of the blocking tooth system relative to the blocking teeth is provided at the belt reel (14), the control tooth system being non-rotatably connected to the blocking tooth system.

2. The belt retractor according to claim 1, wherein an intermediate lever (32) is provided which can be controlled to engage in the control tooth system (26) by the sensor (34).

3. The belt retractor according to claim 2, wherein the intermediate lever (32) is supported at the control lever (28).

4. The belt retractor according to claim 1, wherein the blocking tooth system (24) and the control tooth system (26) are juxtaposed in the axial direction at a flange (20) of the belt reel (14).

5. The belt retractor according to claim 4, wherein the blocking tooth system (24) and the control tooth system (26) have the same pitch and are arranged at the same orientation, the teeth of the control tooth system (26) having a more pointed shape than the teeth of the blocking tooth system (24).

6. The belt retractor according to claim 4, wherein the blocking tooth system (24) and the control tooth system (26) have the same pitch and are arranged at the same orientation, the teeth of the control tooth system (26) having a narrower shape than the teeth of the blocking tooth system (24).

7. The belt retractor according to claim 1, wherein the control tooth system (26) is arranged on a disk (46) that is held to be rotationally fixed to the flange (20).

8. The belt retractor according to claim 7, wherein lands (48) projecting in the axial direction which engage between the teeth of the blocking tooth system (24) in the axial direction are provided at the disk (46), the control tooth system (26) being especially arranged on the lands (48).

9. The belt retractor according to claim 1, wherein load-bearing sides (40) of the blocking tooth system (24) and the control tooth system (26) are identically designed and are aligned with each other and that the opposing tooth surfaces (42, 44) of the blocking tooth system and the control tooth system are designed to be different from each other.

10. The belt retractor according to claim 1, wherein a control pawl adapted to be engaged in an internal tooth system provided at the control lever (28) in a webbing-sensitive manner is provided at the belt reel (14).

11. The belt retractor according to claim 1, wherein the tooth thickness of the control tooth system (26) is smaller than the tooth thickness of the blocking tooth system (24).

12. The belt retractor according to claim 1, wherein the frame (12) is provided with two side members (16) each being provided with blocking teeth (22), and that the belt reel (14) is provided with a blocking tooth system (24) on each of the two axial sides.

13. The belt retractor according to claim 1, wherein the blocking teeth are fixed against rotation relative to the frame.

14. A belt retractor for a seat belt, comprising:
a frame having a plurality of blocking teeth;
a belt reel;
a control lever pivotably mounted to the frame and supporting the belt reel for rotation relative to the frame about an axis of the belt reel;
a blocking tooth system rotatable with the belt reel relative to the frame about the axis of the belt reel, the blocking tooth system engaging the blocking teeth to block rotation of the belt reel relative to the frame;
a control tooth system non-rotatably connected to the blocking tooth system; and
a sensor that actuates when a predetermined vehicle deceleration is exceeded, the sensor interacting with the control tooth system to stop rotation of the blocking tooth system relative to the blocking teeth.

15. The belt retractor according to claim 14, wherein the control tooth system is arranged on a disk that is rotationally fixed to the flange.

16. The belt retractor according to claim 15, wherein the control tooth system is arranged on lands provided at the disk, the lands projecting in an axial direction to engage between the teeth of the blocking tooth system.

17. The belt retractor according to claim 14, wherein the blocking tooth system and the control tooth system are juxtaposed in an axial direction at a flange of the belt reel, the blocking tooth system and the control tooth system having the same pitch and arranged at the same orientation, the teeth of the control tooth system having a more pointed shape than the teeth of the blocking tooth system.

18. The belt retractor according to claim 14, wherein the blocking tooth system and the control tooth system are juxtaposed in an axial direction at a flange of the belt reel, the blocking tooth system and the control tooth system having the same pitch and arranged at the same orientation, the teeth of the control tooth system having a narrower shape than the teeth of the blocking tooth system.

19. The belt retractor according to claim 14, wherein an intermediate lever is supported at the control lever for movement with the control lever, the intermediate lever being controlled to engage in the control tooth system by the sensor.

20. The belt retractor according to claim 14, wherein load-bearing sides of the blocking tooth system and the control tooth system are identically designed and are aligned with each other and that the opposing tooth surfaces of the blocking tooth system and the control tooth system are designed to be different from each other.

* * * * *